3,209,916
FILTER CONSTRUCTION

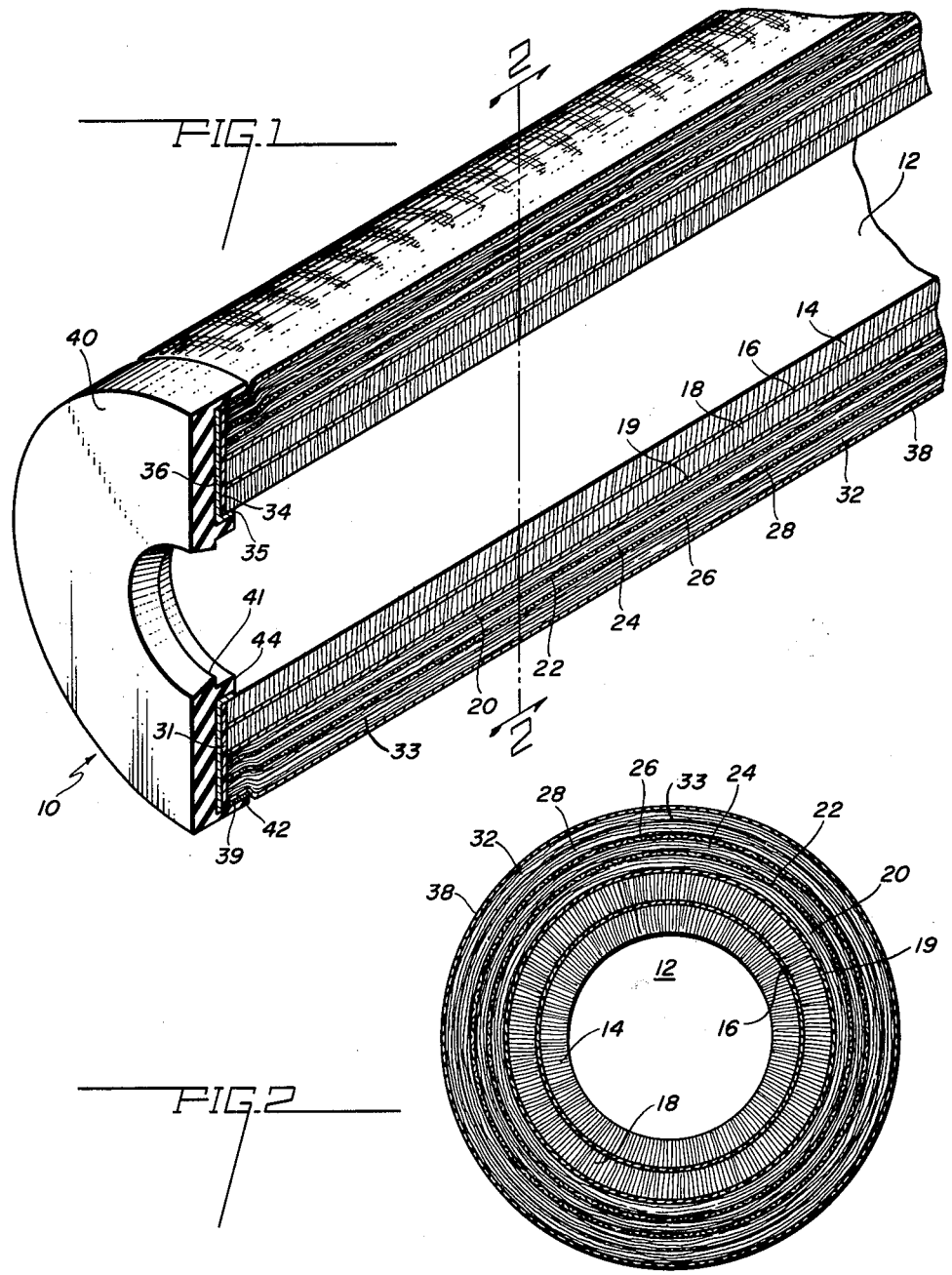

Clifford H. May, Fairfax, Va., and Herman L. Murray, Rockville, Md., assignors to The Briggs Filtration Company, Washington, D.C., a corporation of Maryland
Filed Oct. 4, 1961, Ser. No. 142,829
3 Claims. (Cl. 210—484)

This invention relates to an improved filter construction, and particularly to one which is suitable for removing both solid and liquid contaminants from liquids such as fuels which must of necessity be of utmost purity before combustion.

It is commonplace to find entrained fluids which are dispersed within liquid base fuel and dispersed therein in a discontinuous phase (indiscrete droplets and the like), and the removal of such contaminations is essential to the proper performance of combustion engines of either piston, turbine or jet propulsion type.

It is further essential in the construction of a fuel filter in which contaminants are removed and retained on the surface of the filter, that the filter will not develop clogging or reduce in its efficiency of contamination removal during use.

It is an object of the present invention to provide a filter which will meet these exacting requirements of: (a) efficient removal of both liquid phase and solid phase contaminants from the liquid fuel; (b) the filter will function efficiently over a long period without developing clogging or loss of filtering efficiency; (c) the filter is equally efficient in removing solid and liquid phase contaminants and can operate continuously to channel off the liquid phase filtrate.

Another object of the invention is to devise a novel combination of filter laminations which are related one layer to the next in providing a successively greater filtering action either by change of fiber density or fiber orientation so that the contaminants, as they are removed, will not accumulate at any given location in the filter to form a concentrated blocking obstruction; but instead, the contaminants are removed by "depth filtration" with a uniform distribution of contaminants.

Other objects and features of the invention will become apparent from a consideration of the following description which proceeds with reference to the accompanying drawings wherein:

FIGURE 1 is an isometric view of a filter which is shown in section view taken through the length of the filter to illustrate the filter laminations; and FIGURE 2 is a section view of the filter taken transversely through the filter and looking in the direction of the arrows 2—2 in FIGURE 1.

The filter designated generally by reference numeral 10 in FIGURE 1 is a tubular construction and has a hollow interior, which provides a through passage 12 through which liquid is initially introduced for filtration. The filter is constructed of a plurality of discrete filter layers which differ one from the next by providing an increased filtering action, i.e., either by change of density or change of fiber location, each succeeding layer providing an increased filtering action so that as the fluid progresses through the filter successively finer particle contaminants are removed. This principle is known as "depth filtration." The innermost layer 14 consists of radially oriented fiberglass having a fiber diameter of approximately .00013" and a density of substantially 4 lb./ft.$^3$. The specific method for mounting the fibers in this manner is not a part of the subject invention, but we have found that one convenient way of mounting the fibers is by wrapping in a spiral the outer ends with a layer of cotton gauze 16 having a suitable adhesive to hold the parts together.

The lamination 14 is design to obstruct larger size solid particles of approximately 60 microns and greater, these particles being stopped either at the surface of the first layer or allowed to penetrate a limited distance into the wall of the fiberglass tube. The lamination 14 is about $5/16''$ thickness and is comprised of radially-oriented glass fibers of a fiber diameter of substantially .00013" and has a density less than 6 lbs./ft.$^3$. This filtering action is distinguished from the normal convolute type filter in which the solid contaminants are collected at the surface of the filter layer.

The resin media which mounts the radial-oriented fibers has no obstructing effect on the passage of fluid through the filter, merely stopping the solid contaminants progressively as they penetrate the media.

The next layer 18 which succeeds layer 14 is also of $5/16''$ thickness and comprises radially-oriented glass fibers of a fiber diameter of substantially .00013" but is of greater density than layer 14, being in the order of 6 lb./ft.$^3$. The greater density of the fiberglass causes a greater obstructing effect to solid contaminants and, therefore, as the liquid fuel passes through layer 18, contaminants of smaller size are next removed.

The method of mounting the fibers of layer 18 is substantially similar to the method of mounting layer 14, i.e., a cotton gauze 19 having a suitable adhesive is spirally wrapped around the outer ends of the fibers.

The next suceeding layer 20 is substantially $3/16''$ wall thickness and consists of a convolute fiberglass, i.e., the fibers are located transversely to the direction of flow and, therefore, by their location the crisscrossing fibers produce greater filtering action. The density of layer 20 is about 10 lb./ft.$^3$, and the fiber diameter is substantially .00013". Adjacent layer 20 is a screen 22 of 16 mesh fiberglass having a width of 2½" and is spirally wrapped to provide circumferential reinforcement resisting hoop stresses within the filter and reinforces the layers 14, 18 and 20 which by their construction are incapable of resisting this type force which develops from internal pressure of fluid within passage 12.

Following the screen 22 is a second layer 24 of $3/16''$ wall thickness fiberglass having a density of substantially 10 to 12 lbs./ft.$^3$ with fibers of substantially .00013" diameter and also supported by a spiral wrap of 16 mesh fiberglass screen 26 of 2½" width and including ¼" overlap. The construction is then heated to approximately 325° F. for sufficient time to effect bonding of fiber glass layer 24 with the adjacent screen 26 by suitable fusion of the two media. After molding and bonding the construction is then wrapped with a layer 28, 32 of double thickness of fiberglass material each being approximately ½" thick and having a fiber diameter of substantially .00005", and a density after compression of approximately 2.5 lbs./ft.$^3$. An outer layer 33 made of 100% cellulose acetate felt surrounds the layer 28. The felt wrapper 33 has a thickness of 0.13" and a density of approximately 5 ounces per square yard. The felt wrapper 33 is fungus resistant and has phenomenal "water drop growing" or increasing in size properties.

In the manufacture of the filter, layers 14 and 18 of oriented fiberglass, which were cut to a preselected width, are wrapped around an mandrel (not shown) equal in diameter to the I.D. of the finished element, and the longitudinal seams of the fiberglass are bonded with strip adhesive (not shown).

The layers 20 and 24 are placed over the oriented fiberglass layers 14, 18 with the fibers of said layer 18, running radially around the element, parallel to the flow direction.

The resulting combination layer tubular construction is then treated with a suitable adhesive at its opposite end (one of said ends being indicated by reference numeral 31) and a gasket of resinous or rubber material 34, together with a disk 36 of metal or the like having a flange 35, is joined to the end of the filter to provide both reinforcement and a seal.

A knit stretch nylon sock 38 of any suitable weave is pulled over the outer layer 32 of the filter and the ends turned over and secured by fiberglass tape 39 having a pressure sensitive adhesive. The end caps 40 having sealing lips 42 and 44 which fit over the outer surface and inner surface of the filter is placed on the end to provide further sealing against fluid passage and confines the flow to radial movement through the cross section of the filter layers. These end caps may be made of a molded Buna N rubber material and include knife-edge sealing surfaces 41 on their inner diameter so that sealing can be obtained without the need of end compression on the sealing element and which thereby eliminates any requirement for a perforated center tube. This radial seal has been found to have such improved sealing action over an end compression seal and is capable of sealing at pressures as high as 110 p.s.i.

In operation, fluid to be filtered is fed continuously to the interior passage 12 and, being under pressure, is forced through layers 14–38 which provide successively greater filtering effect proceeding outwardly from the interior of the filter according to "depth filtration' operation. This means that the larger size contaminants are entrapped at the concentrically inner layers, and the fines or smaller particles are entrapped in the outer layers. It is one of the features of the present invention that liquid phase contaminants, as well as solid phase contaminants, are removable by the filtering action, this removal applying to both emulsified and non-emulsified water contaminants.

Emulsified water contaminants are removed through coalescence which takes place in the body of the fiberglass media. In this phenomena of coalescence the factor which plays the most important role in the chemistry of emulsions is interfacial tension. An emulsion is generally defined as a two-phase liquid system in which fine droplets of one liquid are dispersed in a second liquid with which it is immiscible. The components of an emulsion consist of a continuous phase and a dispersed phase. The continuous phase usually is in excess quantity, such as a hydrocarbon fuel with the dispersed phase being water.

The process through which two droplets come together and form one bigger one is called coalescence. The fuel or continuous phase contains the dispersed phase or water as it flows through the fiberglass media. The interfacial tension between the water and fuel causes the fiberglass media to preferentially wet with the continous phase and makes the water droplets appear and behave as substantially rigid balls. After such water droplets travel through the body of the fiberglass media they are stopped in some narrow passageway between fibers of the media. The water droplets then accumulate in narrow passages between fibers of the filter and collect into larger droplets which are removed in that form.

In operation, the unit has been successfully used with as much as 110 p.s.i. pressure drop without producing leakage at the seal points at the opposite ends of the filter and without bursting the walls of the seal. There is no apparent reduction in rate of fuel passage through the filter regardless of the normal accumulation of solid contaminants distributed according to size through the thickness of the filter and distributed approximately uniformly circumferentially of the filter according to the "depth filtration" operation. Consequently, we avoid the disadvantages of surface filtration which characteristically builds up an amount of contaminants and thereafter causes clogging and excessive pressure drops resulting in reducing efficiency, if not inoperativeness.

Because the filter has no exposed metal parts, we have successfully eliminated all problems of corrosion, and we are able to meet all of the test requirements specified by MIL–F–8901 normally considered to be a stringent military requirement.

The invention is not limited to a specific combination of radially disposed and convolutionally disposed fibers, nor are we limited to any specific density of fibers. What we intend is a succession of filter laminations which generally increase in their filtering action and to achieve this either by an increase in density or change in filter location, or a combination of both with the only requirement being that the filtering action becomes successively increased in the direction of fluid passage.

The invention is not limited to the liquid phase material being filtered. Although liquid fuels are disclosed as the material being filtered, the invention is also applicable to the removal of contaminants from any liquid phase material, not necessarily restricted to fuels or the like, and it is intended that the invention will encompass such other liquid materials.

It is to be reasonably expected that those skilled in the art can make numerous revisions and adaptations of the present invention to suit individual design requirements. It is intended that such changes which are inclusive of principles herein disclosed will be included within the scope of the following claims as equivalents of the following invention.

We claim:

1. A filter construction adapted for removing both solid and liquid phase contaminants from a flow of fluid material which is passed through the filter and wherein filtering action is increased as the fluid progresses through such filter, said construction comprising a plurality of filtering layers of a generally increasing filtering ability and including a cylindrical inner chamber for receiving an inlet flow of the material for filtration, an initial filtering layer comprised of fibers which are disposed radially to be in general alignment with the radial flow of fluid undergoing filtration to minimize obstructing effect on the passage of fluid passing therethrough, at least one additional layer of filter material also having fibers disposed in a radial direction to be substantially parallel with the direction of flow of fluid and of a greater density than said initial layer to effect an increased filtering action, a layer of fiber material which is wound over said additional layer of radially disposed fibers and having the fibers oriented transversely to the direction of flow of the fluid passing through the filter to increase the filtering action over that of said radially disposed fibers, means for retaining said respective layers of filter material in their preselected radial and non-radial positions as the fluid is passed under pressure from the interior of the filter radially outwardly to the exterior of the filter through a succession of filter layers which generally increase in their respective filtering actions, at least one screen layer surrounding said filter to provide circumferential reenforcement, and end caps disposed one at each end of said filter to direct the passage of fluid to a prescribed radially outward direction through the filtering layers of successively increasing filtering ability.

2. A filter construction in accordance with claim 1, in which said radially disposed fibers have a diameter of approximately .00013 inch and a density of approximately 4 lb./ft.$^3$, and said transverse fibers are of approximately .00005 inch and a density of approximately 2.5 lb./ft.$^3$.

3. A filter construction in accordance with claim 1 including means for bonding the layer of transversely oriented fibers to the adjacent layer of radially disposed fibers whereby such layers are cohered together.

References Cited by the Examiner

UNITED STATES PATENTS

| | | | |
|---|---|---|---|
| 1,876,326 | 9/32 | Lant | 210—500 X |
| 2,395,301 | 2/46 | Sloan | 210—496 |
| 2,701,062 | 2/55 | Robinson | 210—496 |
| 2,782,933 | 2/57 | Monsarrat | 210—496 X |
| 2,911,101 | 11/59 | Robinson | 210—496 |
| 2,919,030 | 12/59 | Grant | 210—496 X |
| 2,962,121 | 11/60 | Wilber | 210—493 |
| 3,016,345 | 1/62 | Price | 210—496 |
| 3,026,609 | 3/62 | Bryan | 210—496 X |
| 3,061,107 | 10/62 | Taylor | 210—496 X |

OTHER REFERENCES

Chemical Engineering, Inventory Issue 61, (13), page 157; TNI-M-45, September 1954.

REUBEN FRIEDMAN, *Primary Examiner*.

EARL M. BERGERT, *Examiner*.